US007095450B1

(12) United States Patent
Holmes et al.

(10) Patent No.: US 7,095,450 B1
(45) Date of Patent: Aug. 22, 2006

(54) METHOD AND APPARATUS FOR GENERATING A DISPLAY SIGNAL

(75) Inventors: Steven Holmes, Nottingham (GB); Simon Anthony Vivian Cornwell, London (GB); Richard Andrew Kydd, Middlesex (GB); David J Wright, London (GB)

(73) Assignee: Two Way Media Limited, London (GB)

( * ) Notice: Subject to any disclaimer, the term of this patent is extended or adjusted under 35 U.S.C. 154(b) by 0 days.

(21) Appl. No.: 09/446,296

(22) PCT Filed: Jun. 18, 1998

(86) PCT No.: PCT/GB98/01798

§ 371 (c)(1),
(2), (4) Date: May 18, 2001

(87) PCT Pub. No.: WO98/57718

PCT Pub. Date: Dec. 23, 1998

(30) Foreign Application Priority Data

Jun. 18, 1997 (GB) ................................. 9712724.5

(51) Int. Cl.
*H04N 9/74* (2006.01)
*H04N 5/44* (2006.01)
*H04N 7/173* (2006.01)
*G09G 5/00* (2006.01)
*G06F 3/00* (2006.01)
*G06F 9/00* (2006.01)
*G06F 17/00* (2006.01)

(52) U.S. Cl. ....................... 348/586; 348/578; 348/580; 348/600; 348/564; 345/629; 345/632; 345/640; 715/719; 715/764; 715/790; 715/849

(58) Field of Classification Search ................. 348/578, 348/580–5, 586, 588, 600, 562, 563–565, 348/552, 581; 345/629–630, 640, 632–633; 725/110, 139; 715/719, 722, 764, 768, 790, 715/794, 797, 849, 848; H04N 9/74
See application file for complete search history.

(56) References Cited

U.S. PATENT DOCUMENTS 5,423,555 A     6/1995   Kidrin
5,463,728 A * 10/1995   Blahut et al. ................ 715/807

(Continued)

FOREIGN PATENT DOCUMENTS

JP          08098089      12/1996

OTHER PUBLICATIONS

Audio/Video and Synthetic Graphics/Audio For Mixed Media,. Signal Processing Image Communication, vol. 9, No. 4, May 1997, pp. 433-463.

(Continued)

*Primary Examiner*—Brian P. Yenke (57) ABSTRACT

Apparatus for interactively generating a display signal. The apparatus comprises: a receiver (2) for receiving a broadcast signal (15), the broadcast signal comprising a plurality of datastreams each including image data defining a background object (22–270), and control parameters (28–39); a foreground computer generated imagery (CGI) device (3) for generating a foreground computer generated object (CGO); a mixer (4) for combining the foreground CGO with background object image data to generate the display signal; and interaction means (3) for receiving the control parameters from the receiver, monitoring the position of the foreground CGO, and adapting the display signal with reference to the monitored position of the foreground CGO and the received control parameters.

12 Claims, 5 Drawing Sheets

U.S. PATENT DOCUMENTS

| | | | |
|---|---|---|---|
| 5,643,088 A * | 7/1997 | Vaughn et al. | 463/40 |
| 5,731,846 A * | 3/1998 | Kreitman et al. | 348/581 |
| 5,760,838 A * | 6/1998 | Adams et al. | 348/460 |
| 5,774,664 A * | 6/1998 | Hidary et al. | 725/110 |
| 5,790,124 A * | 8/1998 | Fischer et al. | 345/629 |
| 5,905,523 A * | 5/1999 | Woodfield et al. | 725/99 |
| 5,953,076 A * | 9/1999 | Astle et al. | 348/584 |
| 5,990,972 A * | 11/1999 | Bond-Harris et al. | 348/563 |
| 6,029,045 A * | 2/2000 | Picco et al. | 725/34 |
| 6,031,577 A * | 2/2000 | Ozkan et al. | 348/465 |
| 6,069,669 A * | 5/2000 | Park et al. | 348/596 |
| 6,205,231 B1 * | 3/2001 | Isadore-Barreca et al. | 382/103 |
| 6,256,785 B1 * | 7/2001 | Klappert et al. | 725/136 |
| 6,282,713 B1 * | 8/2001 | Kitsukawa et al. | 725/36 |
| 6,400,374 B1 * | 6/2002 | Lanier | 345/630 |
| 6,414,678 B1 * | 7/2002 | Goddard et al. | 345/419 |
| 6,473,130 B1 * | 10/2002 | Kim | 348/565 |
| 6,493,872 B1 * | 12/2002 | Rangan et al. | 725/32 |
| 6,549,659 B1 * | 4/2003 | Welch et al. | 382/203 |
| 6,621,939 B1 * | 9/2003 | Negishi et al. | 382/291 |
| 6,657,637 B1 * | 12/2003 | Inagaki et al. | 345/629 |
| 6,732,369 B1 * | 5/2004 | Schein et al. | 725/39 |
| 6,732,396 B1 * | 5/2004 | Laux et al. | 15/120.2 |
| 6,880,171 B1 * | 4/2005 | Ahmad et al. | 725/134 |

OTHER PUBLICATIONS

MPEG-4: Context and Objectives, Signal Processing Image Communication, vol. 9, No. 4, May 1997, pp. 295-304.

Virtual Actors Living In A Real World, Jan. 1, 1995, pp. 19-29, 210.

* cited by examiner

PRIOR ART

METHOD AND APPARATUS FOR GENERATING A DISPLAY SIGNAL

BACKGROUND OF THE INVENTION (1) Field of the Invention

This invention relates to a method and apparatus for interactively generating a display signal.

(2) Description of the Related Art

Traditional TV broadcast is characterised by temporal synchronisation for all viewers, ignoring the small differences in transit times of the signal due to differences in transmitter to user distances. Therefore at the moment of broadcast all viewers receive the same, uniform signal substantially instantaneously. Interactive forms of the medium, such as Two Way TV, Web TV are generally characterised by providing the viewer with the facility to interact with a designated interactive area of the TV screen. This may utilise a split screen in which the interactive area may have internet information, an on screen menu, or information which may be relevant to the main broadcast part of the TV screen. These systems are characterised by presenting information in response to the user's interaction within a fixed predefined interactive area of the screen.

In contrast to the limited interaction with TV broadcast on current systems, computer games consoles (eg. Sony Playstation, Sega Saturn, Nintendo 64) are presented to the viewer on TV screens or dedicated display screens, but each viewer has the ability to achieve unique interaction with the imagery/sounds presented on the TV, which are processed by the games console using computer technology, in response to the users actions. Generally the user's perceived TV environment (including images, sounds and other sensory signals) are produced by computer generation within the games console, which may or may not also utilise digitised predefined data, such as sounds in the TV environment which shall be referred to as the computer generated environment (CGE) or in the specific case of images, computer generated imagery (CGI). These games consoles and the CGE are characterised by high frequency update rate, typically in excess of 25 frames per second or 25 Hz. This gives the impression of instantaneous or real time response to the user's actions and also a smooth and seamless dynamic image. The individual frames are not discernible as individual frames, but rather contribute to the overall real time dynamic environment, giving the impression of real time control and interaction with the CGE.

It is desirable that the real time CGE is as realistic as possible, and greater degrees of realism are generally achieved by increased computer processing power and by using the most efficient representation in terms of realism versus processing power. By way of example only, one of the most efficient representations for CGI uses relatively coarse polygonal or faceted geometric model in which the greatest detail in terms of polygon distribution would generally be used in the more geometrically complex areas. By a process known as texture mapping, in which photorealistic textures representing surface features are mapped onto the individual polygon faces, a relatively realistic CGI is achieved notwithstanding the relatively coarse polygonal geometry representation. The product of the number of texture mapped polygons in the CGI and the image update rate measured in frames per second yields a number defining the number of texture mapped polygons the computer processing is required to process per second, which may be 1,000,000 polygons per second.

We have identified that the level of interaction offered to the viewers of interactive broadcast TV is limited, and this consequently limits the applications of such medium. Furthermore we have identified that although the interaction of a games console is greater than interactive TV, the actual theme of the CGE is limited to the specific game content loaded into the console, for example via CD ROM, cartridge, the internet or broadcast to a TV with the appropriate hardware to run CGE type games or by other means.

SUMMARY OF THE INVENTION

In accordance with a first aspect of the present invention there is provided apparatus for interactively generating a display signal, the apparatus comprising a receiver for receiving a broadcast signal, the broadcast signal comprising a plurality of datastreams each including image data defining a background object, and control parameters;

a foreground computer generated imagery (CGI) device for generating a foreground computer generated object (CGO);

a mixer for combining the foreground CGO with background object image data from the receiver to generate the display signal; and interaction means for receiving the control parameters from the receiver, monitoring the position of the foreground CGO, and adapting the display signal with reference to the monitored position of the foreground CGO and the received control parameters.

In accordance with a second aspect of the present invention there is provided a method of interactively generating a display signal, the method comprising receiving a broadcast signal, the broadcast signal comprising a plurality of datastreams each including image data defining a background object, and control parameters;

generating a foreground computer generated object (CGO);

combining the foreground CGO with the background object image data to generate the display signal;

monitoring the position of the foreground CGO; and adapting the display signal with reference to the monitored position of the foreground CGO and the received control parameters.

The present invention provides the capability of interaction with the actual broadcast itself as it appears on a screen in real time.

Typically the method and apparatus is provided for use in association with a TV set to provide levels of interaction with broadcast content that is normally associated with a games console, whereby such interaction is achieved within the main broadcast as presented on their TV screen. This provides the user or viewer with a CGE, hereinafter referred to as the foreground computer generated object (foreground CGO) which interacts with the broadcast signal which by way of example only may be delivered by Digital Terrestrial, Satellite or Cable broadcast medium and in which the background object typically changes continuously during the broadcast transmission, not only from programme to programme but from frame to frame at a rate of, by way of example only, in excess of 20 Hz.

DETAILED DESCRIPTION OF THE PREFERRED EMBODIMENTS

Advantageously this invention offers full screen interaction via the foreground CGO with objects represented in the broadcast, for example but not exclusively visible objects, and such interaction is assured even though objects may change position, shape, motion, behaviour at the broadcast update rate, and furthermore the nature of the interaction with such objects may also change at the broadcast rate.

The term "broadcast" as used herein is intended to cover all transmission media, including but not exclusively, digital terrestrial, cable, satellite broadcast to all display devices, including but not exclusively, TV, computer, or games console. The broadcast is typically a mass broadcast (ie. the signal is broadcast simultaneously to a plurality of TVs, computers or game consoles). The signal may also be broadcast via the Internet. The term "datastream" as used herein refers to different broadcast content relating to the same programme, and all datastreams are broadcast substantially simultaneously. The term "programme" refers to a set of such multiple datastreams which relate to the same programme, where each datastream within the set of datastreams making up the programme broadcast are temporally synchronised, and relate to the same content but, by way of example only, offer an alternative view of the content. The term "CGE" as used herein is intended to cover a multimedia representation, including but not exclusively still images, dynamic images, sounds, real time images and real time audio signals. The term "foreground CGO", "foreground CGE" or "foreground" as used herein is intended to relate to any and all representations which are not part of the broadcast, but are computer generated and which may be displayed on the TV screen, by way of example but not exclusively overlaid on the broadcast or in a separate interactive area of the screen. Alternatively the "foreground CGO" "foreground CGE" or "foreground" may apply to such representations which are not part of the broadcast and are not displayed or otherwise represented on the TV screen. By way of example only, portions or sections of the foreground CGO may be hidden from the user or viewer for the purpose of acting as geometric reference to calculate interaction between the foreground CGO and the background object. The term "computer" in the context of "computer generated", "computer processing", "computer generated imagery" or "computer generated environment" refers to any apparatus, equipment, hardware, software, parts thereof and combinations thereof which processes the foreground CGE, and by way of example only may be a computer, a set top box (as produced by General Instruments, Pace Micro Technology by way of example only), a games console (as produced by Sony, Sega, Nintendo by way of example only), parts or sections thereof, or customised hardware including but not exclusively computer memory, a processor and an optional graphics processor. The term "TV screen" or "display screen" as used herein is intended to cover any display device or system or assembly in which there is a display element including but not exclusively, TV screen, computer monitor, projection system, head mounted display. The term "receiving hardware" as used herein refers to any apparatus, equipment, hardware, software, parts thereof and combinations thereof which receives the broadcast datastreams, the receiving hardware input from the broadcast medium and transmits the signals, the receiving hardware output to the mixer, and may by way of example only be referred to as a decoder, and by way of example only may be a computer, a set top box (as produced by General Instruments, Pace Micro Technology by way of example only), a games console (as produced by Sony, Sega, Nintendo by way of example only), parts or sections thereof, or a customised hardware including computer memory, a processor and an optional graphics processor. The term "nominal user position" or "user position" defines a distance measured normal from the plane of the TV screen in a normal direction, to the position of the user, where this distance and the user position are used purely for calculation purposes, and impose no further restriction on the actual user position in addition to the everyday physical constraints. The terms "viewer", "viewers", "user" and "users" can be exchanged and interchanged with no loss of generality. The term "controller" or "hand controller" as used herein refers to any device with which the foreground CGO and interaction with the background CGO is controlled by the user, including but not exclusively motion and interaction, requests to upload and download other data or information. By way of example only, the controller may be an infrared device operated by buttons or direct voice activation.

Advantageously, with the broadcast signal, there are multiple datastreams relating to the programme, each datastream representing, by way of example only, an alternative view, a user selectable view, additional relevant information pertinent to the corresponding frame on one or more of the other datastreams, where each datastream is updated at, by way of example only, 25 Hz. The multiple datastreams may be time-division-multiplexed, ie. transmitted one after the other on a single frequency. Alternatively the datastreams may be frequency-division-multiplexed, ie. transmitted simultaneously on different frequencies.

Advantageously, within the broadcast signal, control parameters are transmitted on each datastream, and temporally synchronised with each frame of the datastream broadcast, which may by way of example only be transmitted at a rate of 25 frames per second, and such control parameters define the interaction the user can achieve between the foreground CGO and the background CGO or the broadcast for each frame, and those control parameters and the associated defined interaction may vary at a rate of eg 25 Hz. The control parameters are used by the interaction means to define the interaction for that particular frame of the datastream broadcast.

Typically the broadcast signal contains multiple datastreams relating to the same programme, and temporally synchronised control parameters. The broadcast is received by the receiving hardware, which by way of example only may be a set top box or part thereof. The receiving hardware transmits the decoded broadcast images to the mixer at a predetermined rate (eg 25 Hz).

Advantageously, the control parameters are concurrently or simultaneously received by the interaction means, and for each frame of the broadcast signal the areas of interaction and the nature of such interaction is stored for each frame. By way of example, the areas of interaction are defined by the co-ordinates in three orthogonal axes resolved or projected into the substantially 2 dimensional plane of the TV screen with a predefined viewing angle, resulting in a 2 dimensional representation of the interaction areas overlaid on each frame of the broadcast and such frames and the associated interactive areas may change at the update rate, eg 25 Hz. For example the viewing angle may be 90° in a horizontal plane, which in turn defines a nominal user position for computer calculations and projection from the three dimensional representation to the two dimensional screen representation. The viewing angle and the corresponding nominal user position define the extent of the broadcast background visible on the screen, and are preferably selected to complement and match broadcast standards for visible viewing angle.

Advantageously the nature of the interaction for each area may include, but not exclusively, areas within the background that the user controlled foreground CGO can interact with, areas which the user can click with a cursor device, areas which are linked to information sources activated by clicking, the type of interaction between the foreground CGO and the interactive area.

Advantageously, the processing within the foreground CGI device generates the foreground CGO, which is the user controlled representation by which the user interacts with the interactive areas defined by the control parameters for each frame. The foreground CGI device transmits the foreground CGO to the mixer to be overlaid on the background object within the broadcast signal for each frame of the broadcast (eg at a rate of 25 Hz), whereby the position, shape and other features of the foreground CGO including but not exclusively colour, sound, direction of motion, visibility, as modified by the user interaction, are updated at the aforementioned rate.

Preferably the mixer combines the representations of the background broadcast and the foreground CGO such that the foreground CGO is overlaid on the background broadcast and the background CGO.

Advantageously there is processing available to determine which individual pixels within the foreground CGO, the background broadcast and any other displayed feature are closer to the plane of the TV screen when measured in the aforementioned three orthogonal axes defining a three dimensional geometric space. Furthermore, for each pixel position of the screen measured in the two dimensional screen co-ordinates, the pixel properties including but not exclusively colour, are those representing the properties of the object closest to the screen measured in the aforementioned 3 orthogonal axes at the point projected onto the two dimensions of the TV screen. Advantageously geometric information relating to the background is conveyed in the control parameters defining the background CGO. Advantageously, parts or sections of objects including but not exclusively the foreground CGO, the background CGO and the broadcast background which when resolved into the screen co-ordinate system lie outside the screen dimensions or lie between the screen and the nominal user position, or are within the screen dimensions but further away from the screen than some other object are not displayed. This process is conventionally known as culling.

Advantageously for material recorded in any format for subsequent broadcast, including but not exclusively Betacam or digitally stored images, the control parameters are encoded in or with the material prior to broadcast. The control parameters for each frame of the broadcast may include the areas of interaction defined in the two dimensional screen co-ordinates, the nature of the allowable interaction, the resulting action arising from such interaction. By way of example only, interaction with one of the areas may cause information to be displayed, or an alternative datastream of the broadcast to be displayed, or further information be displayed on the screen.

Advantageously for live broadcast material or real time feeds, the control parameters are generated automatically or semi-automatically, eg utilising vision systems which interpret each frame of the broadcast as it occurs in order to identify particular features within the frame image, and within such group of features areas that are to be automatically converted to interactive areas. The conversion from vision system identified features to interactive areas may be augmented by the use of technology including but not limited to, artificial intelligence, neural networks, knowledge based systems or combinations thereof, to generate such interactive areas and other control parameters subject to predefined rules based on the identification of the nature of the feature. Preferably, the rate at which the control parameters are generated is commensurate with live broadcasting, and by way of example only, this will be at a rate equivalent to the broadcast frame update rate (eg 25 Hz). For the purpose of illustration only, this technique used with live broadcast may be used for computer games based on live footage or training simulators based on live geographic features and scenarios.

Advantageously, the type of foreground CGO may be selected by the user from a library of such foreground CGO stored in memory, or on a data storage device connected to the foreground CGI device which may be a DC ROM, or a Digital Versatile Disc (DVD). Preferably the foreground CGO may also be downloaded to the foreground CGI device at the beginning or during the broadcast of the control parameters. Such definition of the foreground CGO will define features including but not exclusively, colour, shape, texture, allowable movement, sound effects, articulation on screen.

Advantageously, the foreground CGO object movement and interaction is controlled via a user input using a hand controller (eg a standard or modified infrared controller) and subject to the rules defined by the control parameters for each frame. Alternatively other input devices may be used to control the foreground CGO and interaction including but not exclusively, voice activation, mouse, game controller or pad.

Advantageously, the nature of the foreground CGO will match the nature of the broadcast. By way of example only, a broadcast comprising a road or driving theme where the road representation itself is an interactive area may suit a foreground CGO based on a vehicle, such as a car. The car based foreground CGO will have motion dynamics representative of a real car, to the extent that a games console car is representative. By way of a further example, a broadcast comprising an exploration or tour theme may suit a foreground CGO based on an articulated walking human figure, and the control parameters would define valid interactions, eg the ability to walk the foreground CGO through doors in the broadcast background, but not through walls.

Alternatively in some broadcast programmes or themes, the foreground CGO may not match the broadcast, and may be an abstract representation of the position of the foreground CGO, such as a cursor, an arrow, or an icon graphic of a hand.

When the user controls the foreground CGO with the controller, the foreground CGO may perform functions including translational motion and rotational motion about the three orthogonal axes and combinations thereof resolved into the two dimensional screen co-ordinates, initiate sounds, or interact with defined interactive areas where such interaction results in further action (eg information presentation in text, graphic, video or multi-media forms or combinations thereof).

Advantageously, the user has the option of downloading information from the broadcast, relevant to the broadcast, eg foreground CGO representations, additional information, software, control parameters.

Preferably the user will also have the option of uploading information relevant to the broadcast programme by specific interaction between the foreground CGO and the background CGO. Such uploading is typically achieved by communication between the controller and the interaction means. By way of further examples, certain types of uploaded request may be considered as an uploaded control parameter, which may cause a switch to a different datastream of the broadcast containing additional information, whereas other uploaded requests may be for information not available within the broadcast, and such requests are routed to a World Wide Web site for the specific programme via telephone connection and modem. Preferably the user will also have the option of uploading data relevant to the programme, eg performance scores achieved by the user in an interactive game scenario.

By way of further explanation, it may be informative to consider the control parameters and the interactive areas defined by such parameters as a background CGO with which the user via the controller can cause the foreground CGO to interact with. Preferably, but not essentially, the background CGO includes a coarse geometric representation and visual quality is greatly improved by the aforementioned technique of texture mapping whereby the broadcast image for each frame is a substantially full screen texture which we will refer to a Supertexture. Preferably, the geometry of the background CGO is not visible to the user. By way of further clarification the combination of the foreground CGO, the interaction defined in the control parameters, the background CGO defined: by the control parameters and the broadcast Supertexture provide an interactive CGE based on the broadcast technology which is comparable with that achieved with a games console.

The aforementioned combination of features provides the user with the ability to interact with the features within the broadcast.

Advantageously, this invention may be used as the basis or foundation of a commercial service in which the user pays for usage, eg on a per programme or per unit time basis. Advantageously, such payment method may be incorporated into the apparatus, such as smart card operation, or an additional feature of the interaction via the controller, such as a user capability to enter credit card information which is then treated as uploaded information as previously described, using secure transaction protocols and techniques.

Figure 1:
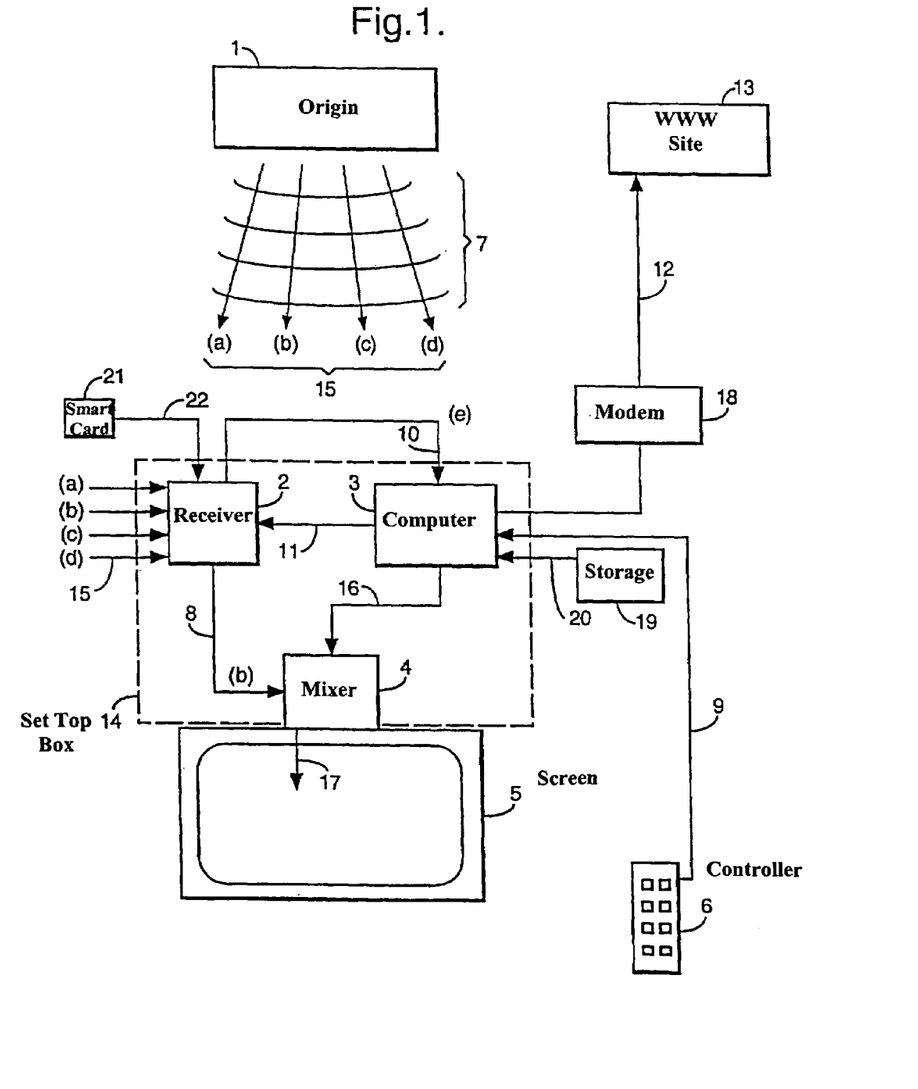
FIG. 1 is a block diagram of an interactive system, according to the present invention.

An embodiment of the present invention will now be described with reference to the accompanying drawings, in which:

FIG. 1 shows a schematic of the apparatus and connectivity. The programme broadcast has an origin 1 and broadcasts multiple datastreams (a)–(d) in a mass broadcast signal 15 via a broadcast medium 7, which are received by receiver hardware 2 in a set top box 14. Only a single set top box 14 is shown but it will be appreciated that the mass broadcast signal 15 will be picked up by a large number of set top boxes at any one time.

Figure 2:
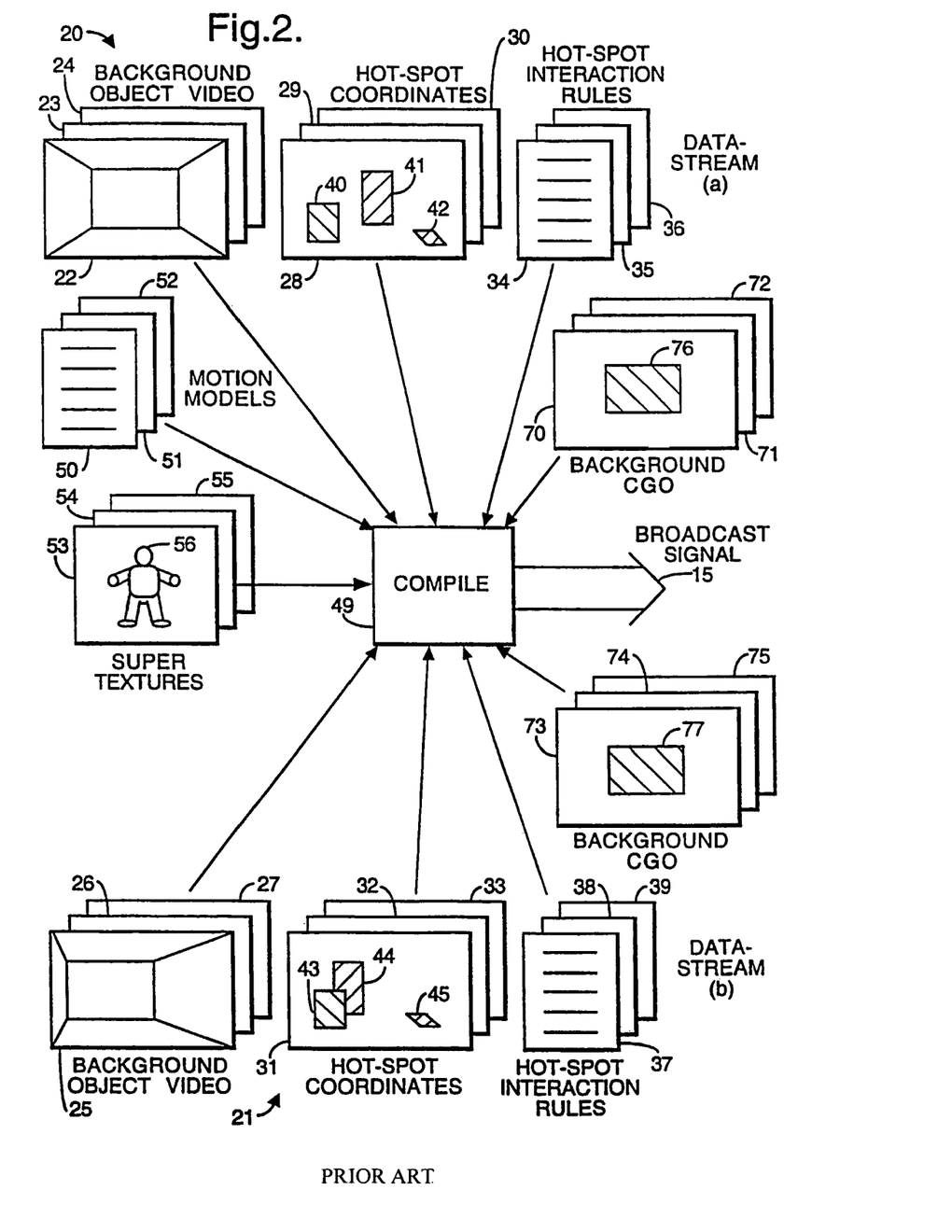
FIG. 2 is a block diagram showing the completion of a broadcast signal, according to the present invention.

FIG. 2 is a schematic drawing illustrating how the origin 1 compiles the broadcast signal 15. In FIG. 2 only two datastreams 20,21 (ie. datastream (a) and datastream (b)) are shown but in a practical system a large number of datastreams will be compiled and broadcast simultaneously, with the number of datastreams being limited only by the bandwidth of the broadcast medium 7.

Each datastream 20,21 comprises a series of frames of background object image data, and control parameters which control interactions with the background image data. The background object image data comprises a series of frames of live full screen broadcast video data (frames 22–27) and CGI image data 70–75 (referred to hereafter as background CGO). In this example frames 22–24 are three subsequent live TV frames of video data showing a room viewed from a central position, and frames 22–24 are views of the same room viewed from a position at one side of the room. The background CGO 70–75 contains a computer generated description of the back wall 76, 77 of the room, along with its 3D positional coordinates. The background CGO 70–75 may be simply in the form of bitmap data or it may be a CGI programme which can be loaded into the set top box to generate a CGI image.

In addition each datastream comprises a set of control parameters including hot-spot coordinates 28–33 and hot-spot interaction rules 34–39. The hot-spot coordinates 28–33 comprise three-dimensional position coordinates which define the positions of "hot-spots" 40–45 in the room as viewed from the respective viewing positions of datastream (a) and datastream (b). The hot-spot interaction rules 34–39 define the nature of the interaction between the foreground object and the hot-spots, as discussed below.

The origin 1 also generates software motion models 50–52 (which define the relationship between the user inputs and the movement of the foreground object, as discussed in further detail below) and foreground supertexture data 53–55. In addition the origin 1 generates frame identifiers 48 which are transmitted with each respective frame of information. For instance items 22,28,34,25,31 and 37 are all associated with the same frame and hence are given the same frame identifier.

The datastreams are compiled by a compiler 49 to form the broadcast signal 15 as illustrated in Table 1. Table 1 illustrates an example in which ten datastreams are carried by the broadcast signal 15. The broadcast signal 15 comprises a series of time-division-multiplexed data packets which are transmitted in the order shown in Table 1. The first two packets contain the supertexture data 53–55 and motion models 50–52. Packet 3 is a datastream identifier associated with datastream (a). Packet 4 is a frame identifier associated with the first frame. Packets 5–8 contain the data associated with the first frame of datastream (a) (ie. items 22,28, 34 and 70 from FIG. 2). Packets 9–14 carry datastream (b) information from the first frame. Packets 15–62 (not shown) carry data associated with the eight other datastreams for the first frame (including packet 57 which is a datastream (j) identifier, and packet 58 which is a frame identifier associated with the first frame).

The next frame of information is then transmitted, starting with packet 63 (datastream (a) identifier) and packet 64 (frame 2 identifier).

Although the background object data and hot-spot data is shown in Table 1 being transmitted at the same rate, it will be appreciated that in other cases (e.g. with a stationary background) the data may be transmitted at different rates.

The non-video data 10 in the broadcast signal 15 (ie. the background CGO data 70–75, the hot-spot coordinates 30 and the hot-spot interaction rules 34–39) are passed to a computer 3, and an initial datastream is selected by an upload request signal 11 from the computer 3 to the receiver hardware 2. The background object video data 8 (eg. frames 22–24) in the selected datastream is decoded and transmitted to a mixer 4. The computer 3 generates a foreground CGI image and a background CGI image (as defined by the programmes contained in the background CGO data 70–72) and the calculated CGI representation 16 is transmitted to the mixer 4. The foreground CGO, the background CGO, and the video data 8 are combined for every pixel on the TV screen 5 and the resulting combined signal 17 is transmitted to the TV screen 5. The multiple datastreams (a)–(d), the control parameters 10, the selected datastream 8, the upload request signal 11, the foreground and background CGO 16 and the combined signal are updated at a rate of, by way of example only, 25 times per second. The foreground CGO and interaction with the background CGO is controlled by the controller 6. Control signals from the controller are transmitted 9 to the computer, which by way of example only, may modify the foreground CGO representation whilst the background CGO is updated based on the updated broadcast control parameters 10 and the recalculated representation 16 is transmitted to the mixer 17. Uploaded information or requests for information not contained within the broadcast will be routed 12 to a World Wide Web site 13 for the specific programme via telephone connection and modem 18. In the case where the invention is used as the basis of a commercial service, the receiver hardware 2 is activated only after valid user payment has been made via the smart card device 21, and the control activation signal 22 has been sent to the receiver hardware 2, thereby initiating the whole process.

FIGS. 4–7 are views of the TV screen S during an interactive game. At the start of the game, the origin 1 transmits the motion models 50–52 and supertexture data 53–55. The data 50–55 is passed to the computer 3 and stored. The user then selects a preferred character to play the game using controller 6. In this example the user selects a human character 56 associated with supertexture data 53 and motion model 50.

Figure 3:
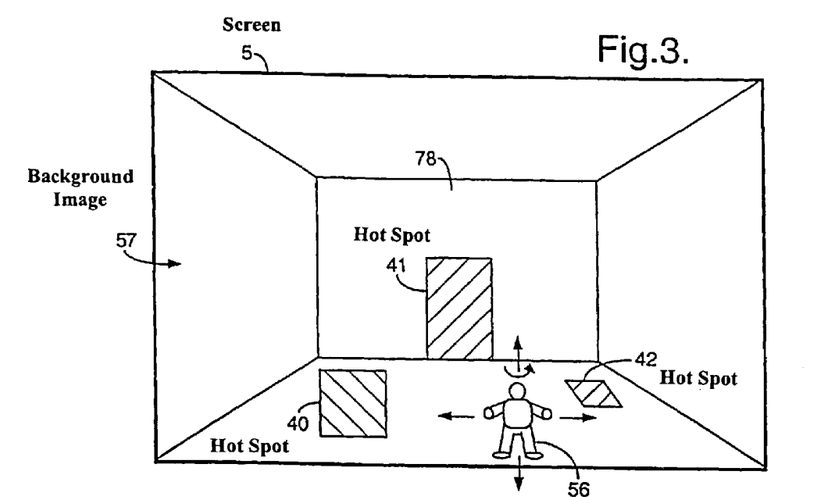
FIG. 3 is a perspective drawing of images that may be displayed on the screen of an interactive system according to the present invention.
Figure 4:
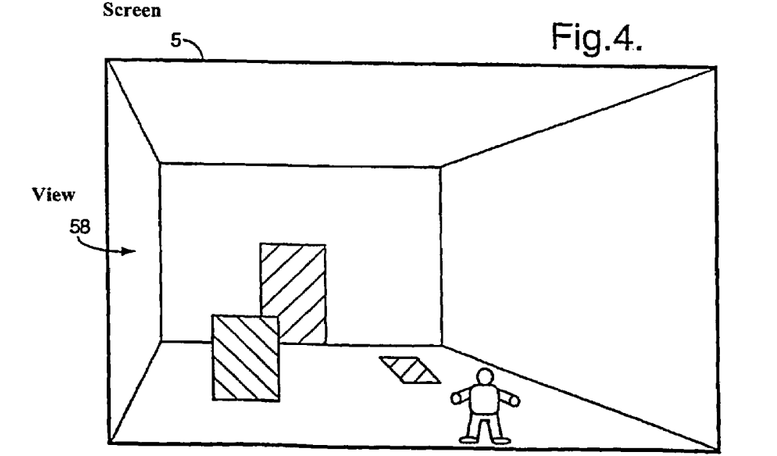
FIG. 4 is a perspective drawing of images that may be displayed on the screen of an interactive system according to the present invention.

The datastreams are then transmitted as illustrated in Table 1. An example of a suitable data protocol is digital MPEG2. Initially the computer 11 automatically generates a default upload request signal 11 (ie. without any input from the controller 6) which causes the receiver 2 to select and decode the default datastream (a). As a result, the image on the screen 5 is as shown in FIG. 3, ie. a background image 57 of a room as defined by the background object video data 22–24, with a back wall 78 generated from background CGO data 70–72, a hot-spot 41 (a door at the back of the room), a hot-spot 40 (a feature, eg a chair or table on the floor of the room) and a hot-spot 42 (a trap-door). The computer 3 generates a coarse CGI representation of character 56, with further definition being provided by the supertexture data 53. Additional supertexture or motion models may be provided by a CD ROM or other storage device 19. The CGI character 56 is transmitted to the mixer 4, and overlaid on the background view 57. By operating controller 6, the user can move the character 56 around the room as indicated by the arrows in FIG. 3, with the range of movement being defined by the motion model 50 associated with the character 56.

When the user presses a "view change" button on controller 6, an upload request signal 11 causes the receiver 2 to switch the selected datastream 8 to datastream (b). The view on screen 5 then changes to the view 58 shown in FIG. 4, as defined by the background video data 25–27 and background CGO 73–75.

Figure 5:
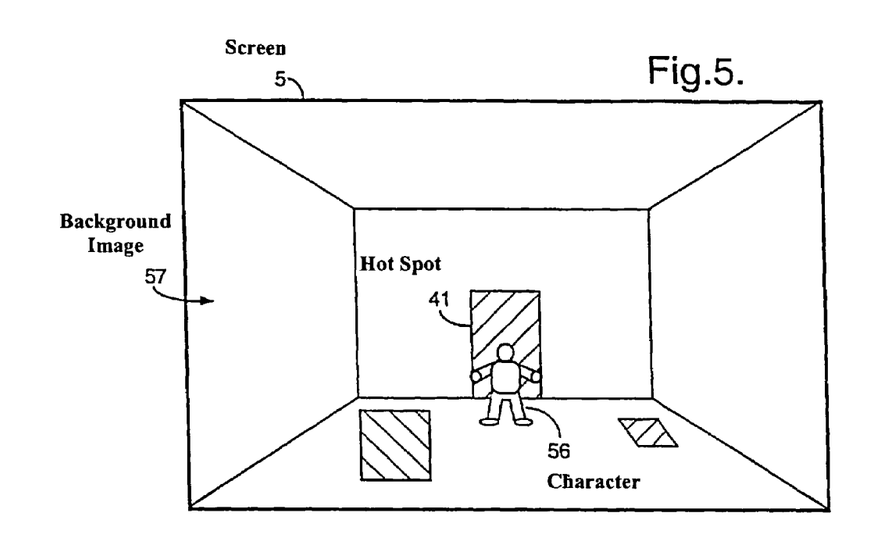
FIG. 5 is a perspective drawing of images that may be displayed on the screen of an interactive system according to the present invention.
Figure 6:
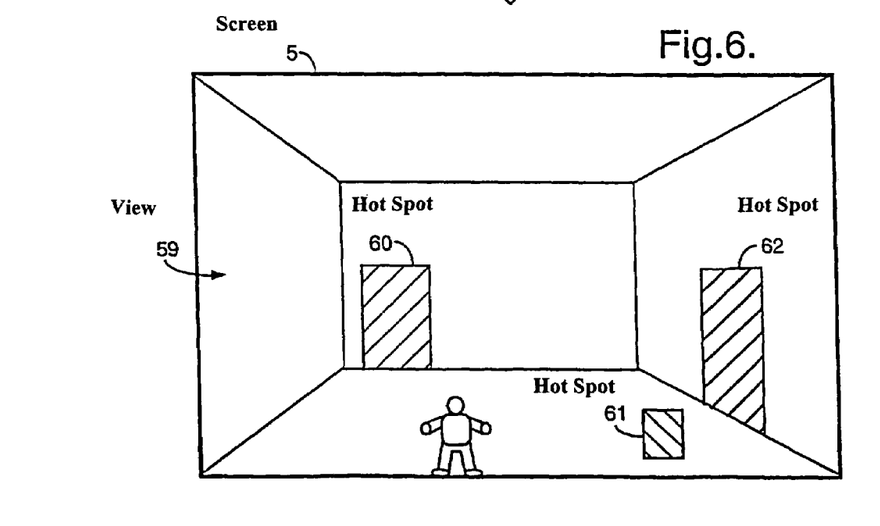
FIG. 6 is a perspective drawing of images that may be displayed on the screen of an interactive system according to the present invention.

An alternative method of switching datastreams is shown in FIGS. 5 and 6. When the character 56 reaches door 41, the computer 3 senses that the character 56 is coinciding with a hot-spot 41 (with reference to the hot-spot coordinates 28–30) and downloads the hot-spot interaction rule (34–36) associated with hot-spot 41. The downloaded rule states "if, character reaches door 41, then cause background CJO image to open door, and then switch to datastream (j)". Therefore the computer 3 first generates a CGI image of the door 41 opening (under the control of the program downloaded from the broadcast GGO data (70–72)) and then generates an upload request signal 11 which causes the receiver 2 to switch to datastream (j) which contains a view 59 of a different room with hot-spots 60–62 (FIG. 6).

Figure 7:
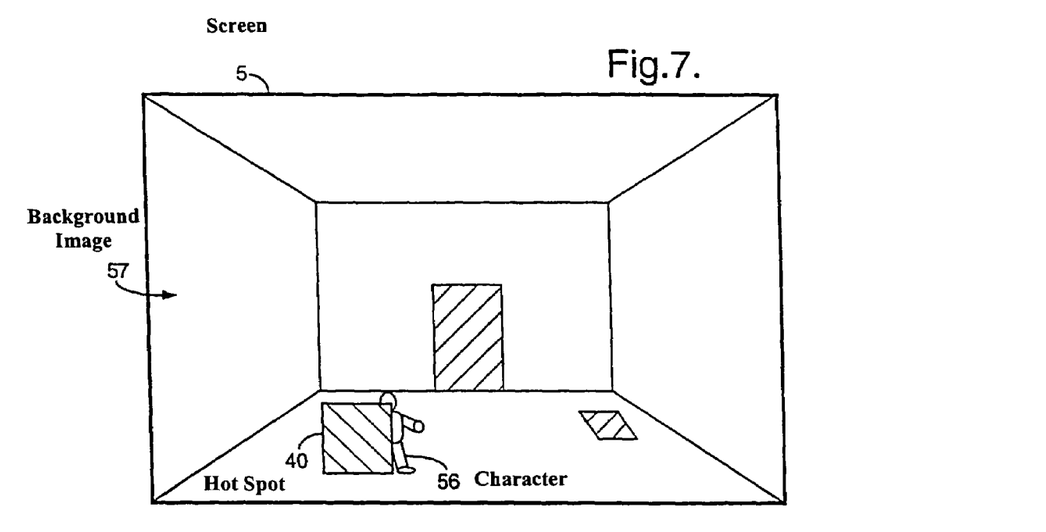
FIG. 7 is a perspective drawing of images that may be displayed on the screen of an interactive system according to the present invention.

The process of "culling" is illustrated in FIG. 7. The computer 3 knows the three-dimensional position of the character 56 in the room 57, and also knows the position of the hot-spot 40 (as contained in the hot-spot coordinates 28–30). If the character 56 is "behind" the hot-spot 40 (as viewed from the current viewing position) then the computer 3 recalculates the representation 16 of the character 56 and does not transmit the obscured part of the character 56 to the mixer 4.

Figure 8:
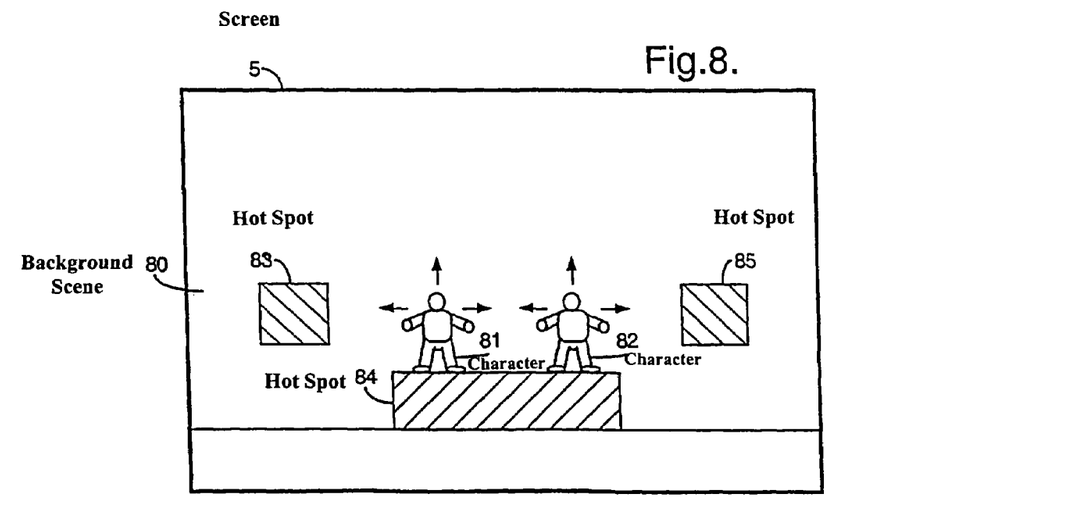
FIG. 8 is a perspective drawing of images that may be displayed on the screen of an interactive system according to the present invention.

FIG. 8 illustrates an alternative, two-dimensional game. A background scene 80 is formed by a single bitmap of background CGO data. A pair of foreground CGI characters 81, 82 in a fighting game are superimposed on the background scene 80, and can be moved around the scene 80 by respective controllers. Three hot-spots 83–85 each display advertising material, and each has an associated hot-spot interaction rule "characters should not pass in front of hot-spot and obscure advertising material". This prevents the computer 3 from causing the characters 81, 82 to pass in front of the hot-spots 83–85. In the case of FIG. 8, the background is static and so the background video data and/or background CGO is only transmitted once during a game, instead of once every frame (as with a moving background).

TABLE 1

| Packet No. | Packet Description |
| --- | --- |
| 1 | character supertextures |
| 2 | character motion models |
| 3 | datastream identifier |
| 4 | frame 1 identifier |
| 5 | background object video data |
| 6 | background object CGO data |
| 7 | hot-spot area coordinates |
| 8 | hot-spot interaction rules |
| 9 | datastream (b) identifier |
| 10 | frame 1 identifier |
| 11 | background object video data |
| 12 | background object CGO data |

TABLE 1-continued

| Packet No. | Packet Description |
|---|---|
| 13 | hot-spot area coordinates |
| 14 | hot-spot interaction rules |
| . | . |
| . | . |
| . | . |
| 57 | datastream (j) identifier |
| 58 | frame 1 identifier |
| . | . |
| . | . |
| . | . |
| 63 | datastream A identifier |
| 64 | frame 2 identifier |
| . | . |
| . | . |
| . | . |

The invention claimed is:

1. Apparatus for interactively generating a display signal, the apparatus comprising:
   a receiver receiving a broadcast signal, the broadcast signal comprising at least one data stream including a sequence of video frames, data defining a background object corresponding to each video frame, and control parameters; and
   a processing system generating a foreground computer generated object (CGO), monitoring the position of the foreground CGO with respect to the background object, and combining the foreground CGO with the background object in accordance with the received control parameters and the monitored position of the foreground CGO to generate the display signal.

2. Apparatus according to claim 1 wherein the control parameters define the position(s) of one or more areas of interaction in the background object, and wherein the processing system modifies the display signal when the position of the foreground CGO coincides with the position of a selected area of interaction.

3. Apparatus according to claim 2 wherein the control parameters define one or more rules associated with each area of interaction, and wherein the processing system modifies the display signal in accordance with each rule associated with the selected area of interaction.

4. Apparatus according to claim 1 wherein the processing system modifies the display signal by modifying the foreground CGO.

5. Apparatus according to claim 1 wherein the broadcast signal comprises a plurality of data streams, the receiver being responsive to an upload request signal to select one of the data streams, and wherein the apparatus further comprises means for inputting upload request signals to the receiver in response to input from a user.

6. Apparatus according to claim 5 wherein the processing system modifies the display signal by inputting an upload request signal to the receiver.

7. Apparatus according to claim 1 further comprising a user operable controller for controlling the foreground CGO generated by the processing system.

8. Apparatus according to claim 1 wherein the control parameters define the three-dimensional position of a feature in the background object, and wherein the processing system causes the foreground CGO to be at least partially obscured when the monitored position of the foreground CGO lies behind the three-dimensional position of the feature.

9. A method of interactively generating a display signal, the method comprising:
   receiving a broadcast signal, the broadcast signal comprising at least one data streams including a sequence of video frames, data defining a background object corresponding to each video frame, and control parameters;
   generating a foreground computer generated object (CGO);
   monitoring the position of the frequent CGO with respect to the background object;
   combining the foreground CGO with the background object in accordance with the received control parameters; and the monitored position of the foreground CGO to generate the display signal.

10. A method according to claim 9, wherein the broadcast signal comprises a plurality of data streams, the method further comprising selecting one of the data streams to be received.

11. A method according to claim 10, wherein each data stream includes a sequence of video frames each representing alternative views relating to a common subject.

12. A method according to claim 10, wherein the selecting step occurs when the foreground CGO is located at a predetermined position relative to the background object.

* * * * *